United States Patent [19]

Betensky

[11] 4,394,072

[45] Jul. 19, 1983

[54] ZOOM LENS

[75] Inventor: Ellis I. Betensky, New York, N.Y.

[73] Assignee: Vivitar Corporation, Santa Monica, Calif.

[21] Appl. No.: 213,611

[22] Filed: Dec. 5, 1980

[51] Int. Cl.³ .............................................. G02B 15/18
[52] U.S. Cl. ..................................................... 350/427
[58] Field of Search ......................................... 350/427

[56] References Cited

U.S. PATENT DOCUMENTS 2,782,684  2/1957  Hopkins ............................. 350/427
3,614,207  10/1971  Basista ............................... 350/427
4,017,161  4/1977  Tsuji ................................. 350/427

Primary Examiner—John K. Corbin
Assistant Examiner—Rebecca D. Gass
Attorney, Agent, or Firm—Robert H. Montgomery

[57] ABSTRACT

A new and improved zoom lens comprises four groups. The powers of the groups from the object end to the image end are positive, negative, negative, and positive, respectively. The first group is stationery for zooming but moves for close focusing. The second and third groups move in the same direction for zooming.

10 Claims, 8 Drawing Figures

ZOOM LENS

FIELD OF THE INVENTION

This invention relates to Zoom Lenses, useful in photography. In particular this invention relates to a relatively compact zoom lens having a zoom ratio of substantially 5 to 2 which is suitable for use in 35 millimeter still photography, that is, an image frame of 24 by 36 millimeters.

BACKGROUND OF THE INVENTION

Zoom lenses having a four group configuration comprising groups of positive, negative, negative, and positive powers from the object end to the image end, respectfully, have been well known, but the designs of such lenses have been more complex relative to positive, negative, positive, positive zoom lens forms. The two negative groups move smoothly in the same direction for zooming, and the first positive group moves for focusing. Previously such zoom lenses have been directed primarily to applications in cinematography where size and performance characteristics are different than are desirable for use in 35 millimeter still photography.

One of the shortcomings in the prior zoom lenses is that the distribution of optical power among the groups does not allow for proper focusing or a suitable front vertex to film distance. In prior art zoom lens designs where the second group is a singlet of negative power, the ratio of the absolute value of the power of the singlet to the power of the first group is greater than 1.75. This ratio has been shown to be unsatisfactory for a low cost lens for 35 millimeter still photography, because of the requirement for relatively expensive glasses in the third group to correct for chromatic aberrations.

Favorable design characteristics cannot be obtained from merely reducing the power ratio of the second to the first group. For instance, it is not sufficient to reduce the power of the second group because the first group must have the proper relationship to permit close focusing.

Conventional designs of zoom lenses of the positive, negative, negative, positive group configuration have heretofore required a relatively large number of elements and have not been successfully employed in producing a suitable compact lens. Such previous zoom lenses frequently employ a rear group comprising a triplet type lens configuration. This latter configuration also tends to detract from the compactness of the lens.

SUMMARY OF THE INVENTION

This invention comprises a zoom lens having four groups of positive, negative, negative, and positive powers from the object end to the image end, respectively. The first negative group is a singlet.

The first group comprises a positive doublet and a positive singlet. The absolute value of the ratio of the powers of the second group to the powder of the first group is less than 1.75.

The fourth positive group comprises a doublet followed by a lens of positive power and a lens of negative power. The absolute value of the ratio of the power of the positive lens to the power of the negative lens is between 0.6 and 1.1.

The two negative groups move smoothly in the same direction for zooming. The relative change in positions results in an EFL of substantially 80 millimeters to 200 millimeters, or a zoom ratio of substantially 5 to 2. The front group moves for focusing.

An object of this invention is to provide a new and improved zoom lens having a positive, negative, negative, and positive power group configuration which is suitable for 35 millimeter still photography.

An object of this invention is to provide a new and improved zoom lens permitting construction with glasses that are inexpensive and easy to produce.

An object of this invention is to provide a new and improved zoom lens which is compact.

An object of this invention is to provide a new and improved zoom lens which is capable of close focusing at any EFL without excessive movement of the front focusing group.

Other objects and advantages of the invention will become apparent from the detailed description and the drawings.

DETAILED DESCRIPTION

Figure 1A:
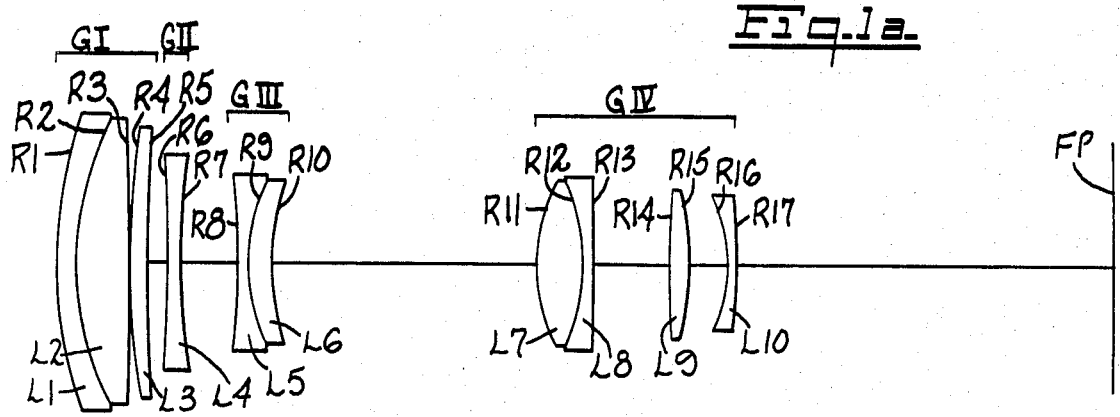
FIGS. 1a–1b, 2a–2b, 3a–3b, and 4a–4b are diagrammatic views of lenses embodying the invention. Each lens is shown in a different operating position in each pair of figures related by the same numeral.

A lens embodying the invention comprises four groups; GI, GII, GIII, and GIV. All elements of the lens are identified by the reference L followed by successive numerals from the object end to the image end. All radii of the lens elements are from a point on the optical axis A of the lens and are identified by the reference R, followed by successive numerals from the first object end lens surface to the last image end lens surface. The radii are positive when the surface is convex to the object end and negative when the surface is concave to the object end.

The spacings D1, D2, and D3 in the drawings are the spacings which vary in axial dimension as the lens groupings move during a change in EFL. FP indicates the focal or image plane of the lens.

Each lens is shown in its minimum EFL position by a figure number followed by a, and in its maximum EFL position, by a figure number followed by b.

Figure 1B:
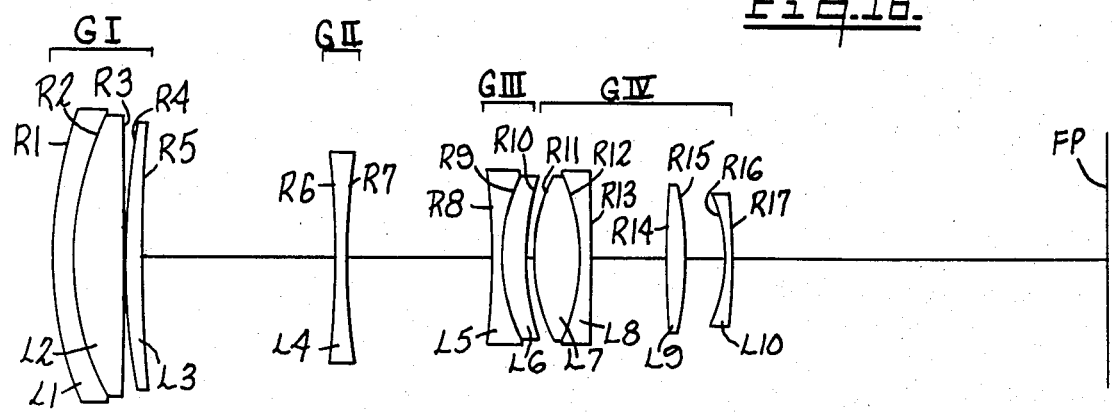

A lens embodying the invention as shown in FIGS. 1a and 1b comprises a first group GI of positive power which is moveable for focusing, but stationary during zooming. Group I comprises elements L1, L2, and L3; a second group GII of negative power which moves toward the image plane as the equivalent focal length of the lens is increased, comprises element L4; a third positive group GIII which moves toward the image plane as the equivalent focal length is increased comprises elements L5 and L6; and a fourth positive group GIV which is stationary comprises elements L7 through L10.

Lens L1, a meniscus element, and Lens L2, a biconvex element form a doublet of overall positive power. Lens L3, a positive meniscus renders Group GI of overall positive power.

Lens L4 is a biconcave element of negative power.

Lens L5, a biconcave element, and Lens L6, a meniscus element of positive power form a doublet of overall negative power which renders Group GIII of overall negative power.

Lens L7 is a relatively thick biconcave lens. Lens L7 is a meniscus lens which is nearly plano concave. The doublet formed by Lenses L6 and L7 is of overall positive power. Lens L9 is a biconvex element of positive power followed by Lens L10 which is a meniscus element of negative power. Group IV which comprises Lenses L7 through L10 has an overall positive power.

FIGS. 1a and 1b illustrate a lens embodying the invention at extreme lower and upper equivalent focal lengths respectively. The axial spaces D1, D2, and D3 vary to change the EFL as hereinafter described.

All of the lenses require relatively shallow surfaces and hence are relatively easy to produce and polish. Of particular note in this regard are the lenses of the third group which correct for chromatic aberrations introduced by the first two groups.

To maintain the compactness of the lens and to allow for relatively inexpensive glasses in the third group, it is desirable that the powers of the first and second groups satisfy the following relation:

$$|K_{II}/K_I| < 1.75$$

where $K_I$ is the power of group GI, and $K_{II}$ is the power of group GII.

In addition, in order to maintain the compact size of the lens and to further provide for the use of relatively inexpensive glasses and shallow lens surfaces, it is desirable that the positive and negative lenses following the positive doublet in the fourth group GIV satisfy the following relationship:

$$0.6 < |K_P/K_N| < 1.1$$

where $K_P$ and $K_N$ are the powers of the positive and negative lenses, respectively, following the positive doublet in group GIV.

Four examples of a lens as shown in FIGS. 1a and 1b are set forth below.

A lens as shown in FIGS. 1a–1b, which has a zoom range to subtend semi-field angles of 5.8° to 14.0°, as scaled to an image frame of 24 mm×36 mm, and an EFL of 80.020 to 193.905 is set forth in Table IA. BFL is the back focal length.

TABLE IA

| Element | Radius of Curvature (mm) | Axial Distance Between Surfaces (mm) | Index of Refraction $N_d$ | Abbe No. $V_d$ |
|---|---|---|---|---|
| L1 | R1 = 81.696 | | | |
| | | 3.000 | 1.785 | 25.7 |
| L2 | R2 = 56.586 | | | |
| | | 9.000 | 1.517 | 64.2 |
| | R3 = −645.055 | | | |
| | | .350 | | |
| L3 | R4 = 177.622 | | | |
| | | 3.400 | 1.517 | 64.2 |
| | R5 = 478.244 | | | |
| | | 34.130 (D1) | | |
| | R6 = −349.635 | | | |
| L4 | | 2.800 | 1.517 | 64.2 |
| | R7 = 152.834 | | | |
| | | 25.583 (D2) | | |
| | R8 = −96.724 | | | |
| L5 | | 1.800 | 1.658 | 50.9 |
| | R9 = 26.756 | | | |
| L6 | | 4.500 | 1.785 | 25.7 |
| | R10 = 60.178 | | | |
| | | 1.500 (D3) | | |
| | R11 = 29.226 | | | |
| L7 | | 8.500 | 1.569 | 56.0 |
| | R12 = −26.067 | | | |
| L8 | | 1.500 | 1.785 | 25.7 |
| | R13 = −295.353 | | | |
| | | 14.002 | | |
| | R14 = 276.742 | | | |

TABLE IA-continued

| Element | Radius of Curvature (mm) | Axial Distance Between Surfaces (mm) | Index of Refraction $N_d$ | Abbe No. $V_d$ |
|---|---|---|---|---|
| L9 | | 3.600 | 1.785 | 25.7 |
| | R15 = −36.733 | | | |
| | | 6.452 | | |
| | R16 = −21.177 | | | |
| L10 | | 1.500 | 1.673 | 32.2 |
| | R17 = −136.403 | | | |
| | BFL = 69.10 | | | |

In the foregoing Table IA, the iris defining the aperture stop is located between elements L8 and L9.

The spacings of the groupings at different equivalent focal lengths are given below in Table IB.

TABLE IB

| | EFL | | |
|---|---|---|---|
| Spacing | 80.020 | 135.392 | 193.905 |
| D1 | 3.120 | 29.930 | 34.130 |
| D2 | 10.000 | 7.914 | 25.583 |
| D3 | 48.109 | 23.361 | 1.500 |
| f/ | 4.50 | 4.50 | 4.50 |

A lens as shown in FIGS. 1a–1b, which has a zoom range to subtend semi-field angles of 5.7° to 14.0°, as scaled to an image frame of 24 mm×36 mm, and an EFL of 80.005 to 196.018 is set forth in Table IIA. BFL is the back focal length.

TABLE IIA

| Element | Radius of Curvature (mm) | Axial Distance Between Surfaces (mm) | Index of Refraction $N_d$ | Abbe No. $V_d$ |
|---|---|---|---|---|
| L1 | R1 = 77.143 | | | |
| | | 3.500 | 1.785 | 25.7 |
| | R2 = 50.796 | | | |
| L2 | | 8.000 | 1.517 | 64.2 |
| | R3 = −424.888 | | | |
| | | .350 | | |
| | R4 = 138.883 | | | |
| L3 | | 4.000 | 1.517 | 64.2 |
| | R5 = 279.201 | | | |
| | | 51.938 (D1) | | |
| | R6 = −240.108 | | | |
| L4 | | 2.800 | 1.517 | 64.2 |
| | R7 = 93.515 | | | |
| | | 8.386 (D2) | | |
| | R8 = −81.076 | | | |
| L5 | | 1.800 | 1.717 | 48.0 |
| | R9 = 20.653 | | | |
| L6 | | 4.500 | 1.785 | 25.7 |
| | R10 = 64.103 | | | |
| | | 1.500 (D3) | | |
| | R11 = 32.581 | | | |
| L7 | | 8.500 | 1.569 | 56.0 |
| | R12 = −21.688 | | | |
| L8 | | 1.500 | 1.785 | 25.7 |
| | R13 = −108.157 | | | |
| | | 13.343 | | |
| | R14 = 346.679 | | | |
| L9 | | 5.446 | 1.785 | 25.7 |
| | R15 = −35.622 | | | |
| | | 7.223 | | |
| | R16 = −22.672 | | | |
| L10 | | 1.500 | 1.785 | 25.7 |
| | R17 = −68.521 | | | |
| | BFL = 75.03 | | | |

In the foregoing Table IIA, the iris defining the aperture stop is located between elements L8 and L9.

The spacings of the groupings at different equivalent focal lengths are given below in Table IIB.

TABLE IIB

| | EFL | | |
|---|---|---|---|
| Spacing | 80.005 | 135.008 | 196.018 |
| D1 | 3.500 | 32.409 | 51.938 |
| D2 | 18.869 | 4.500 | 8.386 |
| D3 | 31.155 | 16.616 | 1.500 |
| f/ | 4.50 | 4.50 | 4.50 |

A lens as shown in FIGS. 1a–1b, which has a zoom range to subtend semi-field angles of 5.7° to 14.0°, as scaled to an image frame of 24 mm×36 mm, and an EFL of 79.977 to 199.775 is set forth in Table IIIA. BFL is the back focal length.

TABLE IIIA

| Element | Radius of Curvature (mm) | Axial Distance Between Surfaces (mm) | Index of Refraction $N_d$ | Abbe No. $V_d$ |
|---|---|---|---|---|
| L1 | R1 = 71.898 | | | |
| | | 3.500 | 1.785 | 25.7 |
| | R2 = 47.938 | | | |
| L2 | | 8.000 | 1.517 | 64.2 |
| | R3 = −472.407 | | | |
| | | .350 | | |
| | R4 = 128.700 | | | |
| L3 | | 4.000 | 1.517 | 64.2 |
| | R5 = 198.079 | | | |
| | | 52.432 (D1) | | |
| | R6 = −176.961 | | | |
| L4 | | 1.500 | 1.517 | 64.2 |
| | R7 = 82.431 | | | |
| | | 8.315 (D2) | | |
| | R8 = −91.809 | | | |
| L5 | | 1.500 | 1.720 | 50.3 |
| | R9 = 22.717 | | | |
| L6 | | 4.000 | 1.762 | 26.6 |
| | R10 = 83.346 | | | |
| | | 1.500 (D3) | | |
| | R11 = 30.913 | | | |
| L7 | | 8.000 | 1.531 | 62.1 |
| | R12 = −23.367 | | | |
| L8 | | 1.500 | 1.785 | 25.7 |
| | R13 = −116.769 | | | |
| | | 12.859 | | |
| | R14 = 142.709 | | | |
| L9 | | 5.446 | 1.785 | 25.7 |
| | R15 = −41.534 | | | |
| | | 9.466 | | |
| | R16 = −22.573 | | | |
| L10 | | 1.500 | 1.785 | 25.7 |
| | R17 = −76.322 | | | |
| | BFL = 73.46 | | | |

In the foregoing Table IIIA, the iris defining the aperture stop is located between elements L8 and L9.

The spacings of the groupings at different equivalent focal lengths are given below in Table IIIB.

TABLE IIIB

| | EFL | | |
|---|---|---|---|
| Spacing | 79.977 | 134.948 | 199.775 |
| D1 | 2.538 | 31.108 | 52.432 |
| D2 | 17.660 | 4.000 | 8.315 |
| D3 | 33.546 | 18.635 | 1.500 |
| f/ | 4.50 | 4.50 | 4.50 |

A lens as shown in FIGS. 1a–1b, which has a zoom range to subtend semi-field angles of 5.7° to 14.0°, as scaled to an image frame of 24 mm×36 mm, and an EFL of 80.017 to 200.044 is set forth in Table IVA. BFL is the back focal length.

TABLE IVA

| Element | Radius of Curvature (mm) | Axial Distance Between Surfaces (mm) | Index of Refraction $N_d$ | Abbe No. $V_d$ |
|---|---|---|---|---|
| L1 | R1 = 82.993 | | | |
| | | 3.500 | 1.785 | 25.7 |
| | R2 = 53.332 | | | |
| | | .506 | | |
| | R3 = 52.534 | | | |
| L2 | | 8.000 | 1.517 | 64.2 |
| | R4 = −689.814 | | | |
| | | .350 | | |
| | R5 = 127.303 | | | |
| L3 | | 4.000 | 1.517 | 64.2 |
| | R6 = 296.800 | | | |
| | | 54.419 (D1) | | |
| | R7 = −136.062 | | | |
| L4 | | 1.500 | 1.517 | 64.2 |
| | R8 = 72.268 | | | |
| | | 8.315 (D2) | | |
| | R9 = −110.011 | | | |
| L5 | | 1.500 | 1.720 | 50.3 |
| | R10 = 25.693 | | | |
| L6 | | 4.000 | 1.762 | 26.6 |
| | R11 = 108.283 | | | |
| | | 1.500 (D3) | | |
| | R12 = 32.691 | | | |
| L7 | | 8.000 | 1.531 | 62.1 |
| | R13 = −24.326 | | | |
| L8 | | 1.500 | 1.785 | 25.7 |
| | R14 = −116.540 | | | |
| | | 13.483 | | |
| | R15 = 161.822 | | | |
| L9 | | 5.446 | 1.785 | 25.7 |
| | R16 = −42.920 | | | |
| | | 9.919 | | |
| | R17 = −23.606 | | | |
| L10 | | 1.500 | 1.785 | 25.7 |
| | R18 = −81.128 | | | |
| | BFL = 76.56 | | | |

In the foregoing Table IVA, the iris defining the aperture stop is located between elements L8 and L9.

The spacings of the groupings at different equivalent focal lengths are given below in Table IVB.

TABLE IVB

| | EFL | | |
|---|---|---|---|
| Spacing | 80.017 | 135.020 | 200.044 |
| D1 | 2.538 | 31.234 | 54.419 |
| D2 | 17.752 | 4.000 | 8.315 |
| D3 | 34.988 | 20.043 | 1.500 |
| f/ | 4.50 | 4.50 | 4.50 |

Figure 2A:
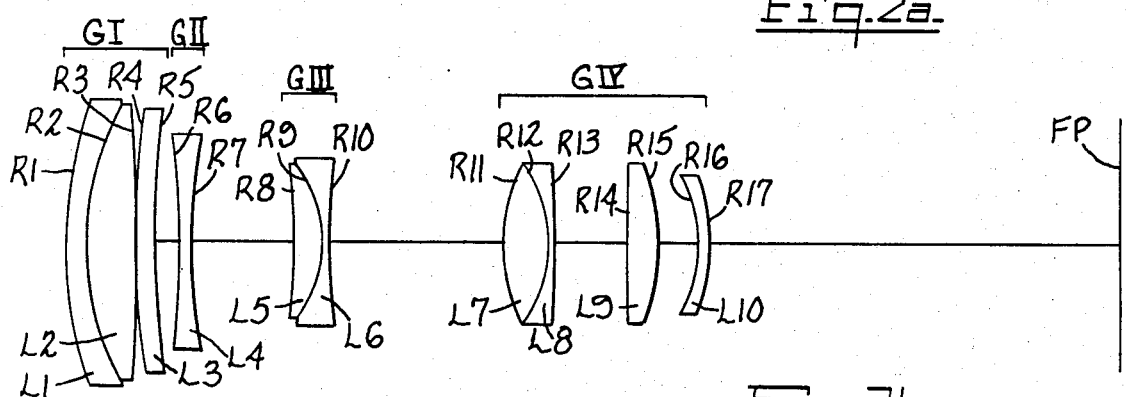
Figure 2B:
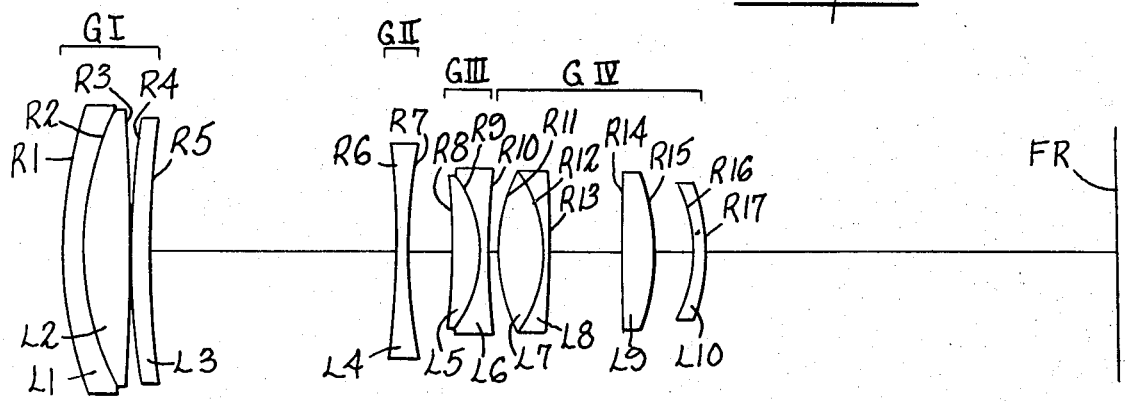

Another embodiment of the invention is shown in FIGS. 2a and 2b. This embodiment differs from the invention shown in FIGS. 1a and 1b, primarily in the lens elements of group GIII.

Lens L5 is a meniscus lens of positive power and lens L6 is a biconcave element of negative power. Lenses L5 and L6 form a doublet of overall negative power.

A prescription of the lens as shown in FIGS. 2a–2b is set forth in Tables VA and VB below.

A lens as shown in FIGS. 2a–2b, which has a zoom range to subtend semi-field angles of 5.7° to 14.0°, as scaled to an image frame of 24 mm×36 mm, and an EFL of 80.005 to 196.012 is set forth in Table VA. BFL is the back focal length.

TABLE VA

| Element | Radius of Curvature (mm) | Axial Distance Between Surfaces (mm) | Index of Refraction $N_d$ | Abbe No. $V_d$ |
|---|---|---|---|---|
| L1 | R1 = 77.754 | | | |
| | | 3.500 | 1.785 | 25.7 |

TABLE VA-continued

| Element | Radius of Curvature (mm) | Axial Distance Between Surfaces (mm) | Index of Refraction $N_d$ | Abbe No. $V_d$ |
|---|---|---|---|---|
| L2 | R2 = 51.376 | 8.000 | 1.517 | 64.2 |
|    | R3 = −420.433 | .350 | | |
| L3 | R4 = 134.035 | 4.000 | 1.517 | 64.2 |
|    | R5 = 259.541 | 52.485 (D1) | | |
| L4 | R6 = −177.941 | 2.800 | 1.517 | 64.2 |
|    | R7 = 77.435 | 7.268 (D2) | | |
| L5 | R8 = −57.296 | 4.500 | 1.762 | 26.6 |
|    | R9 = −21.372 | | | |
| L6 | R10 = 123.126 | 1.800 | 1.694 | 53.3 |
|    | | 1.500 (D3) | | |
| L7 | R11 = 31.323 | 8.500 | 1.569 | 56.0 |
|    | R12 = −21.549 | | | |
| L8 | R13 = −112.601 | 1.500 | 1.785 | 26.1 |
|    | | 13.013 | | |
| L9 | R14 = 350.487 | 5.446 | 1.785 | 25.7 |
|    | R15 = −34.561 | 6.956 | | |
| L10 | R16 = −21.836 | 1.500 | 1.785 | 25.7 |
|    | R17 = −74.150 | | | |
|    | | BFL = 77.19 | | |

In the foregoing Table VA, the iris defining the aperture stop is located between elements L8 and L9.

The spacings of the groupings at different equivalent focal lengths are given below in Table VB.

TABLE VB

| | EFL | | |
|---|---|---|---|
| Spacing | 80.005 | 135.008 | 196.012 |
| D1 | 3.500 | 31.745 | 52.485 |
| D2 | 18.954 | 4.50 | 7.268 |
| D3 | 30.498 | 16.707 | 1.500 |
| f/ | 4.50 | 4.50 | 4.50 |

Figure 3A:
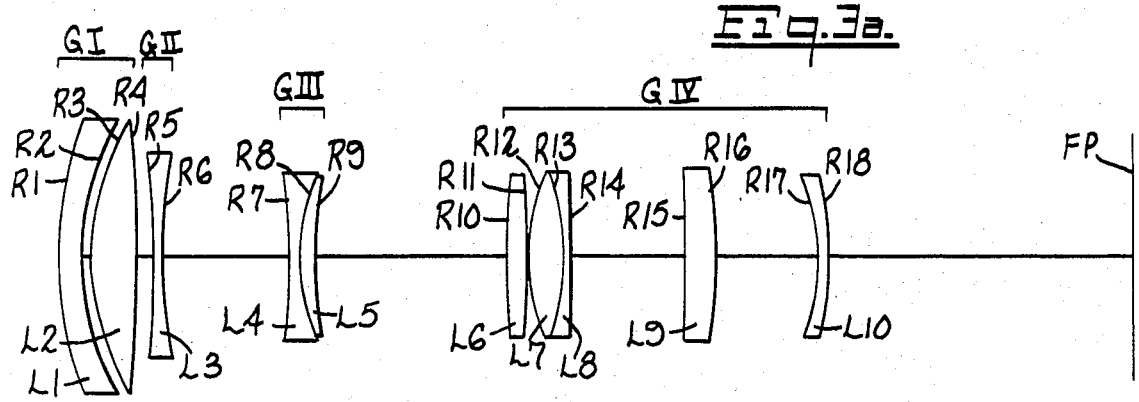
Figure 3B:
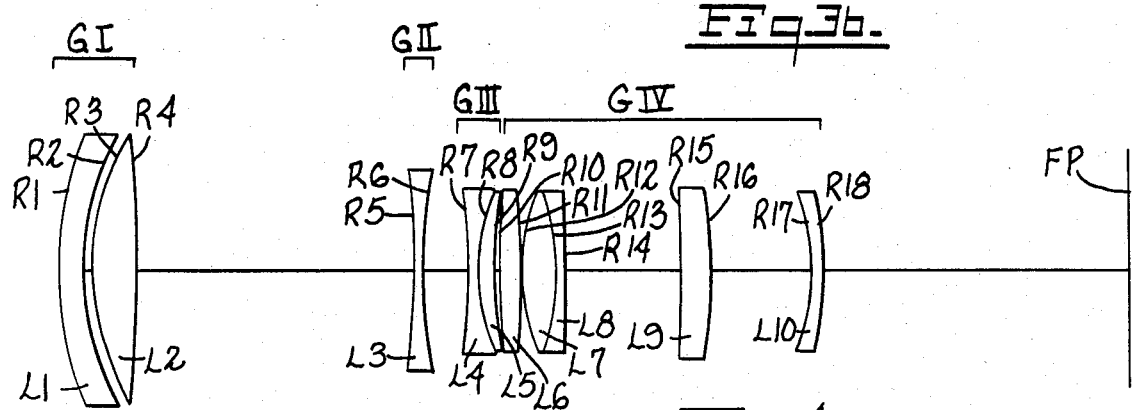

Another embodiment of the invention is shown in FIGS. 3a–3b.

This lens differs from the lens previously shown in FIGS. 1a–1b and described in Tables I–IV in the group GI and the group GIV. Group GI comprises two elements Lens L1 and Lens L2. Lens L1 is a meniscus element of negative power. Lens L2 is a biconvex element of positive power. A thin meniscus air space separates Lens L1 and Lens L2. The overall power of Group GI is positive.

Group GIV differs from the fourth group in the examples of Tables I–IV previously described by virtue of the addition of an additional Lens L6 at the object end of the group. Lens L6 is a biconvex element of positive power. The overall power of the fourth group is positive.

A prescription of this latter embodiment as shown in FIGS. 3a and 3b is set forth in Tables VIA and VIB below.

A lens as shown in FIGS. 3c–3b, which has a zoom range to subtend semi-field angles of 5.7° to 14.0°, as scaled to an image frame of 24 mm × 36 mm, and an EFL of 79.861 to 199.650 is set forth in Table VIA. BFL is the back focal length.

TABLE VIA

| Element | Radius of Curvature (mm) | Axial Distance Between Surfaces (mm) | Index of Refraction $N_d$ | Abbe No. $V_d$ |
|---|---|---|---|---|
| L1 | R1 = 65.576 | 3.500 | 1.805 | 25.5 |
|    | R2 = 44.684 | 1.972 | | |
| L2 | R3 = 46.026 | 8.000 | 1.517 | 64.2 |
|    | R4 = −317.625 | 59.836 | | |
| L3 | R5 = −146.243 | 1.500 | 1.517 | 64.2 |
|    | R6 = 103.458 | 8.112 | | |
| L4 | R7 = −93.560 | 1.500 | 1.620 | 60.3 |
|    | R8 = 27.901 | | | |
| L5 | R9 = 59.343 | 3.000 | 1.785 | 25.7 |
|    | | 1.000 | | |
| L6 | R10 = 147.878 | 4.000 | 1.517 | 64.2 |
|    | R11 = −128.265 | .200 | | |
| L7 | R12 = 45.685 | 6.200 | 1.517 | 64.2 |
|    | R13 = −35.570 | | | |
| L8 | R14 = −137.296 | 1.500 | 1.785 | 25.7 |
|    | | 20.646 | | |
| L9 | R15 = −339.846 | 6.000 | 1.785 | 25.7 |
|    | R16 = −56.094 | 18.339 | | |
| L10 | R17 = −28.316 | 1.500 | 1.785 | 25.7 |
|    | R18 = −68.920 | | | |
|    | | BFL = 55.92 | | |

In the foregoing Table VIA, the iris defining the aperture stop is located between elements L8 and L9.

The spacings of the groupings at different equivalent focal lengths are given below in Table VIB.

TABLE VIB

| | EFL | | |
|---|---|---|---|
| Spacing | 79.861 | 134.770 | 199.650 |
| D1 | 2.500 | 34.555 | 59.836 |
| D2 | 22.573 | 5.531 | 8.112 |
| D3 | 33.722 | 18.706 | 1.000 |
| f/ | 4.50 | 4.50 | 4.50 |

Figure 4A:
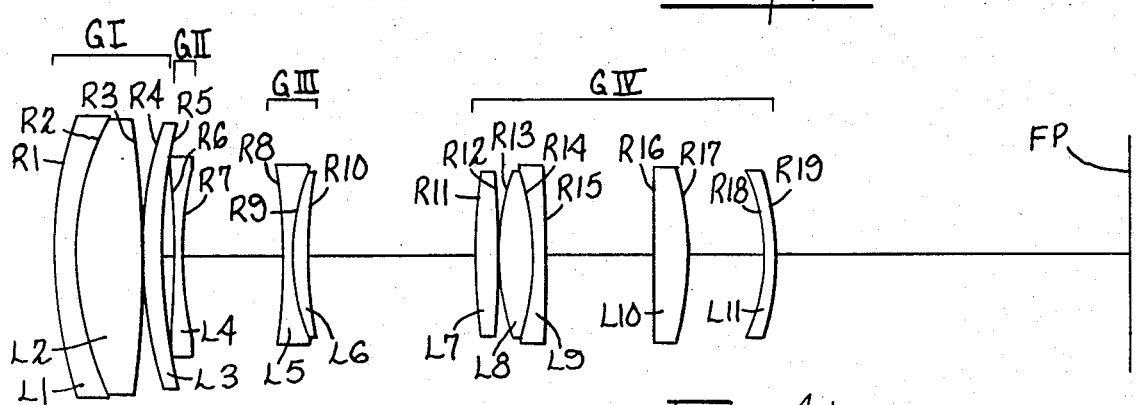
Figure 4B:
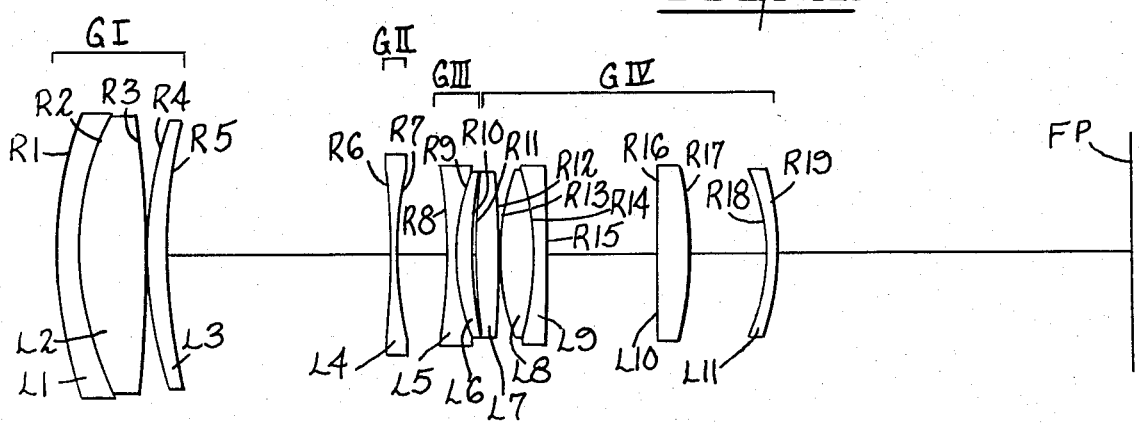

Another embodiment of the invention is described in FIGS. 4a and 4b. This lens differs from the lens previously described with respect to FIGS. 1a and 1b and Tables I–IV by the addition of an additional element Lens L7 to the fourth group GIV. The lens therefore has eleven elements rather than ten elements as set forth in the previously described embodiments. Lens L7 is a biconvex lens of positive power which renders in combination with Lenses L8 through L11, the fourth group GIV of overall positive power.

A prescription of a lens as shown in FIGS. 4a and 4b is set forth in Tables VIIA and VIIB as described below.

A lens as shown in FIGS. 4a–4b, which has a zoom range to subtend semi-field angles of 5.7° to 14.0, as scaled to an image frame of 24 mm × 36 mm, and an EFL of 79.816 to 199.513 is set forth in Table VIIA. BFL is the back focal length.

TABLE VIIA

| Element | Radius of Curvature (mm) | Axial Distance Between Surfaces (mm) | Index of Refraction $N_d$ | Abbe No. $V_d$ |
|---|---|---|---|---|
| L1 | R1 = 78.528 | 3.500 | 1.785 | 25.7 |
| L2 | R2 = 50.985 | 11.600 | 1.517 | 64.2 |
|  | R3 = −271.843 | .350 |  |  |
| L3 | R4 = 80.093 | 4.000 | 1.510 | 63.4 |
|  | R5 = 106.058 | 47.814 (D1) |  |  |
| L4 | R6 = −125.522 | 1.500 | 1.517 | 64.2 |
|  | R7 = 54.778 | 8.931 (D2) |  |  |
| L5 | R8 = −84.673 | 1.500 | 1.589 | 61.3 |
| L6 | R9 = 30.794 | 3.000 | 1.785 | 25.7 |
|  | R10 = 72.230 | 1.000 (D3) |  |  |
| L7 | R11 = 121.524 | 4.000 | 1.517 | 64.2 |
|  | R12 = −128.412 | .200 |  |  |
| L8 | R13 = 38.478 | 6.200 | 1.517 | 64.2 |
| L9 | R14 = −43.290 | 1.500 | 1.785 | 25.7 |
|  | R15 = −608.956 | 20.194 |  |  |
| L10 | R16 = −559.111 | 6.000 | 1.785 | 25.7 |
|  | R17 = −56.639 | 14.265 |  |  |
| L11 | R18 = −26.390 | 1.500 | 1.785 | 25.7 |
|  | R19 = −50.872 | BFL = 65.19 |  |  |

In the foregoing Table VIIA, the iris depending the aperture stop is located between elements L9 and L10.

The spacings of the groupings at different equivalent focal lengths are given below in Table VIIB.

TABLE VIIB

| Spacing | EFL | | |
|---|---|---|---|
|  | 79.816 | 134.665 | 199.513 |
| D1 | 1.404 | 26.881 | 47.814 |
| D2 | 18.355 | 5.531 | 8.931 |
| D3 | 30.487 | 17.836 | 1.000 |
| f/ | 4.50 | 4.50 | 4.50 |

Table VIII set forth below shows the relationships between the powers of the second group GII and the power of the first group GI for each of the preceding examples.

TABLE VIII

| Table | $K_I$ | $K_{II}$ | $|K_{II}/K_I|$ |
|---|---|---|---|
| Table I | .0075 | −.0049 | .65 |
| Table II | .0080 | −.0077 | .96 |
| Table III | .0079 | −.0092 | 1.16 |
| Table IV | .0077 | −.0010 | 1.43 |
| Table V | .0080 | −.0096 | 1.20 |
| Table VI | .0073 | −.0086 | 1.18 |
| Table VII | .0083 | −.0136 | 1.64 |

From the foregoing it can be seen that the following relationship is satisfied:

$|K_{II}/K_I|$ is $<1.75$ where $K_I$ and $K_{II}$ are the powers of the first group GI and the second group GII, respectively.

In Table IX set forth below, relationships between the powers of the first positive element and the negative elements which follow the positive doublet in Group IV are set forth. It should be noted that $K_P$ and $K_N$ will be the powers of elements L9 and L10 in all of the foregoing examples with the exception of the example set forth in Table VI in which case $K_P$ and $K_N$ will represent the powers of lens elements L10 and L11.

TABLE IX

| Table | $K_P$ | $K_N$ | $|K_P/K_N|$ |
|---|---|---|---|
| Table I | .0243 | −.0269 | .90 |
| Table II | .0244 | −.0230 | 1.06 |
| Table III | .0243 | −.0244 | 1.00 |
| Table IV | .0231 | −.0235 | .98 |
| Table V | .0250 | −.0253 | .99 |
| Table VI | .0119 | −.0162 | .73 |
| Table VII | .0126 | −.0141 | .89 |

From the foregoing table, it can be seen the following relationship is satisfied:

$0.6 < |K_P/K_N| < 1.1$ where $K_P$ and $K_N$ are the powers of the positive and negative elements following the positive doublet of the fourth group GIV, respectively.

As shown by the various examples, various lens forms may be made within the scope of the invention. Accordingly, the appended claims are intended to cover all modifications of the disclosed embodiments as well as other embodiments thereof which do not depart from the spirit and scope of this invention.

I claim:

1. A zoom lens comprising from the object end a first positive group, a second negative group, a third negative group, and a fourth positive group, said second group being a singlet and the absolute value of the ratio of the power of said second group to said first group is less than 1.75, said fourth group from the object end comprising a positive doublet followed by a positive lens and a negative lens.

2. The lens of claim 1 wherein said first group moves for focusing and comprises a positive doublet and a positive singlet.

3. The lens of claim 1 wherein $0.6\ K_P/K_N\ 1.1$ where $K_P$ and $K_N$ are the powers of the positive lens and the negative lens, respectively, in the fourth group following said doublet.

4. A lens according to claim 1 having semi-field angles of 5.8° to 14.0° as scaled to a 24×36 mm image frame defined substantially as follows:

| Element | Radius of Curvature (mm) | Axial Distance Between Surfaces (mm) | Index of Refraction $N_d$ | Abbe No. $V_d$ |
|---|---|---|---|---|
| L1 | R1 = 81.696 | 3.000 | 1.785 | 25.7 |
| L2 | R2 = 56.586 | 9.000 | 1.517 | 64.2 |
|  | R3 = −645.055 | .350 |  |  |
| L3 | R4 = 177.622 | 3.400 | 1.517 | 64.2 |
|  | R5 = 478.244 |  |  |  |

-continued

| Element | Radius of Curvature (mm) | Axial Distance Between Surfaces (mm) | Index of Refraction $N_d$ | Abbe No. $V_d$ |
|---|---|---|---|---|
|  |  | 34.130 |  |  |
|  | R6 = −349.635 |  |  |  |
| L4 |  | 2.800 | 1.517 | 64.2 |
|  | R7 = 152.834 |  |  |  |
|  |  | 25.583 |  |  |
|  | R8 = −96.724 |  |  |  |
| L5 |  | 1.800 | 1.658 | 50.9 |
|  | R9 = 26.756 |  |  |  |
| L6 |  | 4.500 | 1.785 | 25.7 |
|  | R10 = 60.178 |  |  |  |
|  |  | 1.500 |  |  |
|  | R11 = 29.226 |  |  |  |
| L7 |  | 8.500 | 1.569 | 56.0 |
|  | R12 = −26.067 |  |  |  |
| L8 |  | 1.500 | 1.785 | 25.7 |
|  | R13 = −295.353 |  |  |  |
|  |  | 14.002 |  |  |
|  | R14 = 276.742 |  |  |  |
| L9 |  | 3.600 | 1.785 | 25.7 |
|  | R15 = −36.733 |  |  |  |
|  |  | 6.452 |  |  |
|  | R16 = −21.177 |  |  |  |
| L10 |  | 1.500 | 1.673 | 32.2 |
|  | R17 = −136.403 |  |  |  |
|  | BFL = 69.10 |  |  |  | where L1–L10 are lens elements from the object end to the image end successively;

R1–R17 are the radii of the element surfaces successively from the object end to the image end; positive radii represent surface elements convex to the object end and negative radii represent surfaces concave to the object end;

$N_d$ is the index of refraction of the elements, and $V_d$ is the dispersion of the elements as measured by the Abbe number;

BFL is the back focal length.

5. A lens according to claim 1 having semi-field angles of 5.7° to 14.0° as scaled to a 24×36 mm image frame defined substantially as follows:

| Element | Radius of Curvature (mm) | Axial Distance Between Surfaces (mm) | Index of Refraction $N_d$ | Abbe No. $V_d$ |
|---|---|---|---|---|
| L1 | R1 = 77.143 | 3.500 | 1.785 | 25.7 |
|  | R2 = 50.796 |  |  |  |
| L2 |  | 8.000 | 1.517 | 64.2 |
|  | R3 = −424.888 |  |  |  |
|  |  | .350 |  |  |
|  | R4 = 138.883 |  |  |  |
| L3 |  | 4.000 | 1.517 | 64.2 |
|  | R5 = 279.201 |  |  |  |
|  |  | 51.938 |  |  |
|  | R6 = −240.108 |  |  |  |
| L4 |  | 2.800 | 1.517 | 64.2 |
|  | R7 = 93.515 |  |  |  |
|  |  | 8.386 |  |  |
|  | R8 = −81.076 |  |  |  |
| L5 |  | 1.800 | 1.717 | 48.0 |
|  | R9 = 20.653 |  |  |  |
| L6 |  | 4.500 | 1.785 | 25.7 |
|  | R10 = 64.103 |  |  |  |
|  |  | 1.500 |  |  |
|  | R11 = 32.581 |  |  |  |
| L7 |  | 8.500 | 1.569 | 56.0 |
|  | R12 = −21.688 |  |  |  |
| L8 |  | 1.500 | 1.785 | 25.7 |
|  | R13 = −108.157 |  |  |  |
|  |  | 13.343 |  |  |
|  | R14 = 346.679 |  |  |  |
| L9 |  | 5.446 | 1.785 | 25.7 |
|  | R15 = −35.622 |  |  |  |
|  |  | 7.223 |  |  |
|  | R16 = −22.672 |  |  |  |
| L10 |  | 1.500 | 1.785 | 25.7 |
|  | R17 = −68.521 |  |  |  |
|  | BFL = 75.03 |  |  |  | where L1–L10 are lens elements from the object end to the image end successively;

R1–R17 are the radii of the element surfaces successively from the object end to the image end; positive radii represent surface elements convex to the object end and negative radii represent surfaces concave to the object end;

$N_d$ is the index of refraction of the elements, and $V_d$ is the dispersion of the elements as measured by the Abbe number;

BFL is the back focal length.

6. A lens according to claim 1 having semi-field angles of 5.7° to 14.0° as scaled to a 24×36 mm image frame defined substantially as follows:

| Element | Radius of Curvature (mm) | Axial Distance Between Surfaces (mm) | Index of Refraction $N_d$ | Abbe No. $V_d$ |
|---|---|---|---|---|
| L1 | R1 = 71.898 | 3.500 | 1.785 | 25.7 |
|  | R2 = 47.938 |  |  |  |
| L2 |  | 8.000 | 1.517 | 64.2 |
|  | R3 = −472.407 |  |  |  |
|  |  | .350 |  |  |
|  | R4 = 128.700 |  |  |  |
| L3 |  | 4.000 | 1.517 | 64.2 |
|  | R5 = 198.079 |  |  |  |
|  |  | 54.432 |  |  |
|  | R6 = −176.961 |  |  |  |
| L4 |  | 1.500 | 1.517 | 64.2 |
|  | R7 = 82.431 |  |  |  |
|  |  | 8.315 |  |  |
|  | R8 = −91.809 |  |  |  |
| L5 |  | 1.500 | 1.720 | 50.3 |
|  | R9 = 22.717 |  |  |  |
| L6 |  | 4.000 | 1.762 | 26.6 |
|  | R10 = 83.346 |  |  |  |
|  |  | 1.500 |  |  |
|  | R11 = 30.913 |  |  |  |
| L7 |  | 8.000 | 1.531 | 62.1 |
|  | R12 = −23.367 |  |  |  |
| L8 |  | 1.500 | 1.785 | 25.7 |
|  | R13 = −116.769 |  |  |  |
|  |  | 12.859 |  |  |
|  | R14 = 142.709 |  |  |  |
| L9 |  | 5.446 | 1.785 | 25.7 |
|  | R15 = −41.534 |  |  |  |
|  |  | 9.466 |  |  |
|  | R16 = −22.573 |  |  |  |
| L10 |  | 1.500 | 1.785 | 25.7 |
|  | R17 = −76.322 |  |  |  |
|  | BFL = 73.46 |  |  |  | where L1–L10 are lens elements from the object end to the image end successively;

R1–R17 are the radii of the element surfaces successively from the object end to the image end; positive radii represent surface elements convex to the object end and negative radii represent surfaces concave to the object end;

$N_d$ is the index of refraction of the elements, and $V_d$ is the dispersion of the elements as measured by the Abbe number;

BFL is the back focal length.

7. A lens according to claim 1 having semi-field angles of 5.7° to 14.0° as scaled to a 24×36 mm image frame defined substantially as follows:

| Element | Radius of Curvature (mm) | Axial Distance Between Surfaces (mm) | Index of Refraction $N_d$ | Abbe No. $V_d$ |
|---|---|---|---|---|
| L1 | R1 = 82.993 | | | |
| | | 3.500 | 1.785 | 25.7 |
| | R2 = 53.332 | | | |
| | | .506 | | |
| L2 | R3 = 52.534 | | | |
| | | 8.000 | 1.517 | 64.2 |
| | R4 = −689.814 | | | |
| | | .350 | | |
| L3 | R5 = 127.303 | | | |
| | | 4.000 | 1.517 | 64.2 |
| | R6 = 296.800 | | | |
| | | 54.419 | | |
| L4 | R7 = −136.062 | | | |
| | | 1.500 | 1.517 | 64.2 |
| | R8 = 72.268 | | | |
| | | 8.315 | | |
| L5 | R9 = −110.011 | | | |
| | | 1.500 | 1.720 | 50.3 |
| | R10 = 25.693 | | | |
| L6 | | 4.000 | 1.762 | 26.6 |
| | R11 = 108.283 | | | |
| | | 1.500 | | |
| L7 | R12 = 32.691 | | | |
| | | 8.000 | 1.531 | 62.1 |
| | R13 = −24.326 | | | |
| L8 | | 1.500 | 1.785 | 25.7 |
| | R14 = −116.540 | | | |
| | | 13.483 | | |
| L9 | R15 = 161.822 | | | |
| | | 5.446 | 1.785 | 25.7 |
| | R16 = −42.920 | | | |
| | | 9.919 | | |
| L10 | R17 = −23.606 | | | |
| | | 1.500 | 1.785 | 25.7 |
| | R18 = −81.128 | | | |
| | BFL = 76.56 | | | | where L1–L10 are lens elements from the object end to the image end successively;
R1–R18 are the radii of the element surfaces successively from the object end to the image end;
positive radii represent surface elements convex to the object end and negative radii represent surfaces concave to the object end;
$N_d$ is the index of refraction of the elements, and $V_d$ is the dispersion of the elements as measured by the Abbe number;
BFL is the back focal length.

8. A lens according to claim 1 having semi-field angles of 5.7° to 14.0° as scaled to 24×36 mm image frame defined substantially as follows:

| Element | Radius of Curvature (mm) | Axial Distance Between Surfaces (mm) | Index of Refraction $N_d$ | Abbe No. $V_d$ |
|---|---|---|---|---|
| L1 | R1 = 77.754 | | | |
| | | 3.500 | 1.785 | 25.7 |
| | R2 = 51.376 | | | |
| L2 | | 8.000 | 1.517 | 64.2 |
| | R3 = −420.433 | | | |
| | | .350 | | |
| | R4 = 134.035 | | | |
| L3 | | 4.000 | 1.517 | 64.2 |
| | R5 = 259.541 | | | |
| | | 52.485 | | |
| | R6 = −177.941 | | | |
| L4 | | 2.800 | 1.517 | 64.2 |
| | R7 = 77.435 | | | |
| | | 7.268 | | |
| | R8 = −57.296 | | | |
| L5 | | 4.500 | 1.762 | 26.6 |
| | R9 = −21.372 | | | |
| L6 | | 1.800 | 1.694 | 53.3 |
| | R10 = 123.126 | | | |
| | | 1.500 | | |
| | R11 = 31.323 | | | |
| L7 | | 8.500 | 1.569 | 56.0 |
| | R12 = −21.549 | | | |
| L8 | | 1.500 | 1.785 | 26.1 |
| | R13 = −112.601 | | | |
| | | 13.013 | | |
| | R14 = 350.487 | | | |
| L9 | | 5.446 | 1.785 | 25.7 |
| | R15 = −34.561 | | | |
| | | 6.956 | | |
| | R16 = −21.836 | | | |
| L10 | | 1.500 | 1.785 | 25.7 |
| | R17 = −74.150 | | | |
| | BFL = 77.19 | | | | where L1–L10 are lens elements from the object end to the image end successively;
R1–R17 are the radii of the element surfaces successively from the object to the image end;
positive radii represent surface elements convex to the object end and negative radii represent surfaces concave to the object end;
$N_d$ is the index of refraction of the elements, and $V_d$ is the dispersion of the elements as measured by the Abbe number;
BFL is the back focal length.

9. A lens according to claim 1 having semi-field angles of 5.7° to 14.0° as scaled to 24×36 mm image frame defined substantially as follows:

| Element | Radius of Curvature (mm) | Axial Distance Between Surfaces (mm) | Index of Refraction $N_d$ | Abbe No. $V_d$ |
|---|---|---|---|---|
| L1 | R1 = 65.576 | | | |
| | | 3.500 | 1.805 | 25.5 |
| | R2 = 44.684 | | | |
| | | 1.972 | | |
| | R3 = 46.026 | | | |
| L2 | | 8.000 | 1.517 | 64.2 |
| | R4 = −317.625 | | | |
| | | 59.836 | | |
| | R5 = −146.243 | | | |
| L3 | | 1.500 | 1.517 | 64.2 |
| | R6 = 103.458 | | | |
| | | 8.112 | | |
| | R7 = −93.560 | | | |
| L4 | | 1.500 | 1.620 | 60.3 |
| | R8 = 27.901 | | | |
| L5 | | 3.000 | 1.785 | 25.7 |
| | R9 = 59.343 | | | |
| | | 1.000 | | |
| | R10 = 147.878 | | | |
| L6 | | 4.000 | 1.517 | 64.2 |
| | R11 = −128.265 | | | |
| | | .200 | | |
| | R12 = 45.685 | | | |
| L7 | | 6.200 | 1.517 | 64.2 |
| | R13 = −35.570 | | | |
| L8 | | 1.500 | 1.785 | 25.7 |
| | R14 = −137.296 | | | |
| | | 20.646 | | |
| | R15 = −339.846 | | | |
| L9 | | 6.000 | 1.785 | 25.7 |
| | R16 = −56.094 | | | |
| | | 18.339 | | |
| | R17 = −28.316 | | | |

-continued

| Element | Radius of Curvature (mm) | Axial Distance Between Surfaces (mm) | Index of Refraction $N_d$ | Abbe No. $V_d$ |
|---|---|---|---|---|
| L10 | | 1.500 | 1.785 | 25.7 |
| | R18 = −68.920 | | | |
| | | BFL = 55.92 | | | where L1–L10 are lens elements from the object end to the image end successively;

R1–R18 are the radii of the element surfaces successively from the object end to the image end; positive radii represent surface elements convex to the object end and negative radii represent surfaces concave to the object end;

$N_d$ is the index of refraction of the elements, and $V_d$ is the dispersion of the elements as measured by the Abbe number;

BFL is the back focal length.

10. A lens according to claim 1 having semi-field angles of 5.7° to 14.0° as scaled to a 24×36 mm image frame defined substantially as follows:

| Element | Radius of Curvature (mm) | Axial Distance Between Surfaces (mm) | Index of Refraction $N_d$ | Abbe No. $V_d$ |
|---|---|---|---|---|
| L1 | R1 = 78.528 | 3.500 | 1.785 | 25.7 |
| L2 | R2 = 50.985 | 11.600 | 1.517 | 64.2 |
| | R3 = −271.843 | .350 | | |
| L3 | R4 = 80.093 | 4.000 | 1.510 | 63.4 |
| | R5 = 106.058 | 47.814 | | |

-continued

| Element | Radius of Curvature (mm) | Axial Distance Between Surfaces (mm) | Index of Refraction $N_d$ | Abbe No. $V_d$ |
|---|---|---|---|---|
| L4 | R6 = −125.522 | 1.500 | 1.517 | 64.2 |
| | R7 = 54.778 | 8.931 | | |
| L5 | R8 = −84.673 | 1.500 | 1.589 | 61.3 |
| | R9 = 30.794 | | | |
| L6 | R10 = 72.230 | 3.000 | 1.785 | 25.7 |
| | R11 = 121.524 | 1.000 | | |
| L7 | R12 = −128.412 | 4.000 | 1.517 | 64.2 |
| | R13 = 38.478 | .200 | | |
| L8 | R14 = −43.290 | 6.200 | 1.517 | 64.2 |
| L9 | R15 = −608.956 | 1.500 | 1.785 | 25.7 |
| | R16 = −559.111 | 20.194 | | |
| L10 | R17 = −56.639 | 6.000 | 1.785 | 25.7 |
| | R18 = −26.390 | 14.265 | | |
| L11 | R19 = −50.872 | 1.500 | 1.785 | 25.7 |
| | | BFL = 65.19 | | | where L1–L11 are lens elements from the object end to the image end successively;

R1–R19 are the radii of the element surfaces successively from the object end to the image end; positive radii represent surface elements convex to the object end and negative radii represent surfaces concave to the object end;

$N_d$ is the index of refraction of the elements, and $V_d$ is the dispersion of the elements as measured by the Abbe number;

BFL is the back focal length.

* * * * *